United States Patent Office 3,272,736
Patented Sept. 13, 1966

3,272,736
METHOD OF PREVENTING CORROSION
Anthony J. Petro, Elizabeth, and Paul E. Krystow, Mountainside, N.J., assignors to Esso Research and Engineering Company, a corporation of Delaware
No Drawing. Filed July 23, 1964, Ser. No. 384,804
15 Claims. (Cl. 208—348)

This invention concerns a method for preventing or minimizing destructive corrosion of metallic petroleum refining equipment. More particularly, this invention relates to a process for minimizing or preventing corrosion of crude oil distillation equipment, especially the atmospheric pipestill and the overhead or condensing equipment. A further object of this invention is to minimize or prevent fouling of processing equipment by deposition of undesired inorganic compounds which are either present in the crude or formed as the result of treatment of the crude to reduce corrosion.

Most crude petroleums contain numerous naturally occurring constituents and impurities which will cause severe corrosion of the metals from which conventional petroleum refining equipment is constructed. These corrosive or corrosion-causing materials are varied in scope and composition. They include materials such as water, either naturally admixed or added during production. Water would, of course, include mixtures such as brine. Another particularly troublesome agent is hydrogen sulfide, which is dissolved both in the crude and in any water which is found within the system. Oxygen is also present both dissolved in the crude and in the water, as well as in air which may be absorbed during any processing or handling. Oxygen is especially troublesome in that it depolarizes cathodic reactions and hence increases corrsion rates of aqueous $H_2S$ and hydrochloric acid. The hydrochloric acid which is found in the system is generated by the high temperature hydrolysis (>200° F.) of magnesium and calcium chlorides which are contained in the water phase.

With respect to the hydrochloric acid, at pipestill temperatures, the acid is formed either by the reaction of magnesium chloride and water or calcium chloride and water to yield the respective oxide and 2 moles of hydrochloric acid. The elevated temperatures involved, force the reaction to the right because the hydrochloric acid formed is volatile and thereby removed from the reaction scene. On distillation, however, it goes overhead and dissolves in any condensed water, thereby renewing its corrosive abilities. Naturally, this is the primary corrosive present in the system so that all efforts to prevent overhead corrosion have been directed toward neutralizing this acid so that the use of expensive alloys could be avoided.

Attempts to combat these problems have been widespread throughout the oil industry. They have included the addition of sodium hydroxide or sodium carbonate solutions to the feedstream or to the overhead. This has not proven to be effective for a variety of reasons. When these materials are injected into the overhead, mixing with the vapor stream has been poor because the neutralizers are not volatile. When injected directly into the feed itself, the quantity of these materials required is such as to cause plugging of preheat exchangers by compounds such as calcium and magnesium carbonates and oxides and salts of organic acids which have limited solubilities under the process conditions. Also, it has been found that when sodium hydroxide or sodium carbonate is added to the crude feedstream, these chemicals do not completely prevent HCl evolution from the crude into the condensed overhead distillate water.

Another alternative which has been used widely in the past is ammonia. This has not proven to be effective when injected into the overhead equipment because of the apparent incompleteness of neutralization resulting from noninstantaneous mixing, and because the resulting ammonium chloride causes fouling and plugging of the overhead condenser. Ammonium chloride deposits on equipment surfaces which operate at temperatures above the boiling point of water. Hence, no liquid water exists and the deposit cannot be flushed out. Instead, water must be periodically injected into the equipment to flush it (which is another problem in itself). (By "fouling" we means deposition of a layer of material thick enough to prevent the required heat exchange between hot and cold streams in the condenser. When this builds up enough, we get plugging.) Also, when ammonia is added directly into the pipestill or into the pumparound feed, fouling deposits form on the lower trays, as well as other pieces of equipment and the fractionating efficiency is greatly reduced.

The addition of organic inhibitors into the overhead systems also has not proven completely effective. These compounds have traditionally been film-forming amines which are unstable at higher temperatures. They must be added continuously in order to keep the metal surface coated with a protective film and their cost is rather high compared to caustic and soda ash. Also, if entrained through to the hydrofiner, they can very readily poison the catalyst.

More recently a system has been devised which has eliminated some of the previous problems. The system, as disclosed in U.S. Patent 2,913,406 involves the use of a complex cuprammonium compound, specifically, $Cu(NH_3)_2CO_3$. The complex can be formed in a variety of ways, one of which is by adding ammonia to a water slurry of $CuCO_3$. The formation of the ammonia complex is the mechanism by which the otherwise insoluble $CuCO_3$ is solubilized. The function of the copper ion is to act as a catalyst in removing oxygen from the stream. The cupric ion is first reduced to the cuprous state by mercaptans in the stream whereupon the cuprous ion reduces the free oxygen and is in turn oxidized back to the cupric state. Thus a small amount of copper is effective in removing a relatively large amount of oxygen.

As mentioned above, this invention has met with some success in the prevention of corrosion. However, the system does present several drawbacks.

The presence of copper in the system renders the cost of the additive considerably higher than other systems including the present invention. Furthermore, the usefulness of the copper as a catalyst in removing oxygen is limited by two factors: Only as much oxygen can be removed as there is mercaptan present to convert cupric ion to catalytically effective cuprous ion, and only crudes devoid of $H_2S$ can be effectively freed of oxygen by the copper, since $H_2S$ which is present or formed during processing of almost every crude oil immediately precipitates copper as the highly insoluble copper sulfide, thus removing it from the system and curtailing its function. The copper sulfide then becomes a problem in that it is able to foul or plug the processing equipment. Also copper ion can promote serious pitting corrosion if it plates onto steel surfaces. This type of corrosion phenomenon has been observed in petroleum refining equipment. Thus a desired improvement in this system would concern the elimination of copper to reduce treatment costs as well as to prevent formation of fouling deposits of copper sulfide.

According to this invention these problems have been eliminated. It has unexpectedly been found that an injection of sodium hydroxide or potassium hydroxide alone or in combination as a base and ammonium carbonate into the crude oil feedstreams markedly reduces generation of corrosive acids and thus minimizes corrosion and fouling of processing equipment at substantially lower costs.

The following mechanism is offered to explain the instant invention. However, it should be emphasized, that no intent is present to be bound by any particular mechanism. The sodium hydroxide serves to neutralize organic acids and $H_2S$ present or formed in the feed as well as to establish a sufficient concentration of sodium ion to minimize formation of $NH_4Cl$. The carbonate ion causes precipitation or otherwise ties up calcium and magnesium ions which are present thereby preventing their hydrolysis with consequent generation of acid. The ammonium ion serves to solubilize these carbonates, that is to say, the calcium and magnesium carbonates which are formed, preventing their deposition in the equipment and to provide additional neutralizing capacity to tie up the minimum quantity of generated hydrochloric acid. The sodium hydroxide provides alkalinity thus further preventing formation of corrosive acids. Since free acid is not present and subsequently distilled into the overhead equipment, ammonia need not be injected into the overhead for neutralization, a practice which is currently followed in many refineries. Deposition of ammonium chloride in the overhead, which would lead to further corrosion and fouling, is thus minimized. The sodium hydroxide to be added must be injected in sufficient amount to neutralize the acid which is present. Sufficient sodium hydroxide should be added to neutralize from 25% to 175% of the acid which is present in the stream, preferably from 50% to 150% neutralization by sodium hydroxide would be desired. In its most preferred form this invention dictates that sufficient sodium hydroxide be added to the crude so that 50% to 125% of the acid present in the crude be neutralized. The amount of NaOH (or KOH) to be added will depend on the crude to be processed. Normally, a range from 5 p.p.m. to 100 p.p.m. will cover most crudes. With respect to ammonium carbonate about 1.5 to 5 p.p.m. by weight of ammonium carbonate should be added to the crude, preferably 1.5 to 3 p.p.m. by weight of ammonium carbonate should be added and in its most preferred form this invention would require about 2 p.p.m. by weight of ammonium carbonate added to the crude oil. Ammonium carbonate is usually added in the form of a 20% aqueous solution.

It should be emphasized that anything said with relation to sodium hydroxide as an additive is equally true of potassium hydroxide which may be added in place of or in conjunction with sodium hydroxide.

In the practice of this invention, the sodium hydroxide is added to the crude oil feedstream, preferably at ambient temperatures as a concentrated aqueous solution. The ammonium carbonate is then added, as a concentrated aqueous solution, preferably at a short distance, about 10–30 feet, farther downstream but still at ambient temperature, that is, before the crude has been heated.

Although this invention may be utilized with a great variety of feedstocks, it will be of particular use with the following feedstocks: Aramco, Iraq, Kuwait, Safaniya, Bachaquero, Tia Juana, Lagunilla, Redwater, Leduc, Abquaiq, Agajari, Zelten, Brega, West Texas, Gach Saran, San Joaquin, Lirik, Quirequire and Parentis.

*Example 1*

In this example a desalted West Texas crude oil which contains 16.4 lbs. of salt/Mbbls., 2.38 grams of $H_2S$ per 100 gallons, 2.22 wt. percent of sulfur as corrosive impurities per 100 gallons is steam distilled prior to treatment. Overhead products are recovered containing corrosive materials as follows:

Water—pH—1.0 (acidic)
Distillate—.209 wt. percent sulfur (as hydrogen sulfide)
Chlorides—10.6 p.p.m.
Corrosion rate on carbon steel—greater than .500 inch per year (Metal lost annually from original thickness).

Before the steam distillation, the additive of this invention is injected into another sample of the same crude. About 15 p.p.m. of sodium hydroxide and 3 to 6 p.p.m. of ammonium carbonate are added to the West Texas crude and the mixture is steam distilled immediately. The temperature upon addition is 70–100° F. Afterwards an analysis is run of the crude oil and it is discovered that the pH of the water has increased to more than 7 and that the distillate contains .209 wt. percent of sulfur as ammonium polysulfide and .6 p.p.m. of chloride as ammonium chloride. Neither of these products precipitates out of solution. The corrosion rate of carbon steel is less than .025 inch per year.

This represents a marked decrease in the corrosivity of the crude as a result of being treated with the additive of the instant invention. It should be noted that the chlorides present without the treatment after steam distillation would readily precipitate out and cause a considerable degree of fouling.

*Example 2*

In this case the conditions are identical with Example 1 except that potassium hydroxide is substituted for sodium hydroxide and results obtained which are substantially identical to those obtained in Example 1.

*Example 3*

An undesalted Redwater crude oil which contained 40 lbs. of salt per M/bbls., 175 grams of $H_2S$ per 100 gallons and .69 wt. percent sulfur as corrosive impurities is steam distilled prior to treatment and produces overhead products containing corrosive materials as follows:

Water—pH—1.0 (highly acidic)
Distillate—0.08 wt. percent sulfur as hydrogen sulfide
Chlorides as hydrogen chloride—75 p.p.m.
Corrosion rate of carbon steel—greater than .500 inch per year.

To another portion of this crude is added 90 p.p.m. of sodium hydroxide and 3 to 6 p.p.m. of ammonium carbonate. The products are added into the crude prior to distillation. This is done at a temperature of 70–100° F. immediately after steam distillation.

Analysis indicated the following:

Water—pH of more than 7.0 which is alkaline
Distillate—0.08 wt. percent sulfur as ammonium polysulfide
Chlorides as ammonium chloride—66 p.p.m.

Corrosion rate of carbon steel is less than .025 inch per year. It should be noted that the chlorides present without the treatment after steam distillation would be much more severe than Example 1 and would precipitate out to cause serious fouling.

*Example 4*

In Example 4 the exact conditions of Example 3 are utilized except that instead of sodium hydroxide the identical amount of potassium hydroxide is added. Results were obtained which are substantially identical.

The treating compositions will ordinarily be injected directly into the crude oil entering the distillation system where it may be thoroughly admixed therewith, however, this is optional. In most cases about 0.75 gallon of 20% ammonium carbonate solution per 1,000 bbls. of crude oil will provide satisfactory treatment, although it will be understood that this volume ratio may be varied widely. The reactions with the corrosive constituents appear to take place substantially instantaneously at atmospheric temperatures and it is found that the distillation, fractionation, condensing and cooling equipment will be markedly free of any form of corrosion or of deposits of reaction products such as frequently are found to result from the use of other treating agents.

What is claimed is:

1. The process of claim 1 wherein the distillation is a in metallic distillation equipment used for the distillation of a petroleum fraction said fraction containing an alkaline earth chloride and water which comprises admixing ammonium carbonate and a base, said base selected from the group consisting of sodium hydroxide, potassium hydroxide and mixtures thereof, with said petroleum fraction prior to raising the temperature of said fraction to a level of at least about 200° F. and thereby avoiding hydrolysis of the alkaline earth chlorides and thereafter distilling said petroleum fraction.

2. The process of claim 1 wherein the distillation is a steam distillation.

3. The process of claim 1 wherein said petroleum fraction is a crude oil.

4. The process of claim 1 wherein said ammonium carbonate and said base are added at ambient conditions.

5. The process of claim 1 wherein 1.5 to 5 p.p.m. of ammonium carbonate is added to said petroleum fraction.

6. The process of claim 1 wherein said ammonium carbonate and said base are added to said petroleum fraction when said fraction is at a temperature of about 70°–100° F.

7. The process of claim 1 wherein said alkaline earth chloride is selected from the group consisting of magnesium chloride and calcium chloride.

8. A method of preventing hydrochloric acid corrosion in metallic distillation equipment used for the distillation of a crude oil fraction said fraction containing an alkaline earth chloride and water which comprises admixing ammonium carbonate and a base, said base selected from the group consisting of sodium hydroxide, potassium hydroxide and mixtures thereof with said crude oil fraction prior to raising the temperature of said crude oil fraction to at least about 200° F. and thereby avoiding hydrolysis of the alkaline earth chlorides and thereafter steam distilling said crude oil fraction.

9. The process of claim 8 wherein said alkaline earth chlorides are selected from the group consisting of magnesium chloride and calcium chloride.

10. The process of claim 9 wherein said base is sodium hydroxide.

11. The process of claim 9 wherein said base is potassium hydroxide.

12. The process of claim 9 wherein said admixing takes place at ambient conditions.

13. The process of claim 9 wherein said admixing takes place with said crude oil at a temperature of 70°–100° F.

14. A method of preventing hydrochloric acid corrosion in metallic distillation equipment used for the distillation of a crude oil fraction said fraction containing calcium chloride and magnesium chloride and water which comprises admixing ammonium carbonate in the amount of 1.5 to 5 p.p.m. and a base, said base selected from the group consisting of sodium hydroxide, potassium hydroxide and mixtures thereof with said crude oil fraction prior to raising the temperature of said crude oil fraction to at least about 200° F. and thereby avoiding hydrolysis of the magnesium chloride and calcium chloride and thereafter steam distilling said crude oil fraction.

15. The process of claim 14 wherein said admixing takes place with said crude oil at a temperature of 70°–100° F.

References Cited by the Examiner

UNITED STATES PATENTS

| | | | |
|---|---|---|---|
| 257,961 | 5/1882 | McGowan | 208—226 |
| 1,413,005 | 4/1922 | Cobb | 208—226 |
| 1,844,475 | 2/1932 | Morrell et al. | 208—348 |
| 1,902,221 | 3/1933 | Day | 208—230 |
| 2,105,874 | 1/1938 | Aldridge et al. | 208—348 |
| 2,162,933 | 6/1939 | Bolinger et al. | 208—348 |
| 2,458,049 | 1/1949 | Bloch et al. | 202—57 |

DELBERT E. GANTZ, *Primary Examiner.*

R. H. SHUBERT, *Assistant Examiner.*

---

UNITED STATES PATENT OFFICE
CERTIFICATE OF CORRECTION

Patent No. 3,272,736　　　　　　　　　　　　　　September 13, 1966

Anthony J. Petro et al.

It is hereby certified that error appears in the above numbered patent requiring correction and that the said Letters Patent should read as corrected below.

Column 5, line 1 strike out "The process of claim 1 wherein the distillation is a" and insert instead -- A method of preventing hydrochloric acid corrosion --.

Signed and sealed this 1st day of August 1967.

(SEAL)
Attest:

Edward M. Fletcher, Jr.　　　　　　　　　　　　　EDWARD J. BRENNER

UNITED STATES PATENT OFFICE
CERTIFICATE OF CORRECTION

Patent No. 3,272,736                      September 13, 1966

Anthony J. Petro et al.

It is hereby certified that error appears in the above numbered patent requiring correction and that the said Letters Patent should read as corrected below.

Column 5, line 1 strike out "The process of claim 1 wherein the distillation is a" and insert instead -- A method of preventing hydrochloric acid corrosion --.

Signed and sealed this 1st day of August 1967.

(SEAL)
Attest:

Edward M. Fletcher, Jr.                      EDWARD J. BRENNER
Attesting Officer                           Commissioner of Patents